July 7, 1959    KARL-HEINZ SCHMIDT ET AL    2,893,800
V-SHAPED SEALING RING

Filed Nov. 22, 1957

INVENTORS
*Karl-Heinz Schmidt*
*and Richard Heep*
BY *Thomas, Weisman & Russell*
ATTORNEYS United States Patent Office 2,893,800
Patented July 7, 1959

2,893,800

V-SHAPED SEALING RING

Karl-Heinz Schmidt, Burscheid (Koln), Fullsichel, and Richard Heep, Burscheid (Koln), Griesberg, Germany, assignors, by mesne assignments, to Rand-Goetze Corporation, Cleveland, Ohio, a corporation of Ohio Application November 22, 1957, Serial No. 698,287

6 Claims. (Cl. 309—44)

This invention relates to a piston ring for use in internal combustion engines and more particularly to a ring which, in cross section, is V-shaped in configuration. The ring of the invention is unique over known constructions in at least one primary aspect, among others: the ring is of such a construction as to take advantage of combustion gases under relatively high pressure in performing its main function, that of creating an effective, contacting seal with the cylinder wall.

It is well known that piston rings as they are generally used in internal combustion engines today generally fall within a standard structural pattern. By this is meant that such rings are tension rings or rings which are in the same sense spring loaded so as to exert a constant outward thrust against the cylinder wall. There are recognized disadvantages of this type of tension ring despite wide usage of the same in various types of engines. Such disadvantages, in general, stem from the basic principle of operation of such rings, just mentioned, that the sealing effect is attained solely as a consequence of the inherent built-in tension or spring loading of such rings.

More specifically, the ordinary type of tension ring, either square or rectangular in cross-sectional configuration, is adapted to be seated in a ring groove or slot complementary to this same shape. However, in order to seat such rings upon the piston and to permit the natural expansion of same to function, it is necessary to provide a ring groove that is substantially larger in dimension than the dimension, in cross section, of the ring itself. This means that there is a substantial top, bottom and back clearance between the ring and the ring groove in which it is seated. Consequently, these rings, particularly during high speed operation of the engine, and due to the rapidity of motion of the stroke of the piston as well as to the periodical pressure of combustion gases, tend to "flutter" considerably or reciprocate substantially within the materially larger ring groove. This tendency to flutter, coupled with the factor mentioned, a substantial back clearance, permits, under these conditions, a substantial by-passing of the combustion gases around and back of the ring through the ring groove, obviously resulting in a substantial decrease in operating efficiency.

There is another well recognized deficiency inherent in the use of the ordinary tension rings. Since a tension or spring loading principle is involved, the ring is consequently exerted against the face of the cylinder wall with the same constant pressure irrespective of whether or not a work or non-working stroke of the piston is involved. Hence, it is to be appreciated that the involved friction during all operative cycles of the piston remains at a constant and whether or not the stroke of the piston is, for example, a power stroke or a return, non-working stroke. In the case of such return stroke, where much less sealing effect is necessary, it is thus seen that these constant frictional forces are nevertheless still present. All of this is in sharp contrast to the functions attained by the instant invention where, as will be seen, the ring, being directly responsive to the pressures exerted by the combustion gases, is pressed more tightly into contact with the cylinder wall during working strokes of the piston than during the return or non-working strokes thereof. In consequence, the involved frictional forces mentioned are substantially less for such appreciably diminish during such non-working cycles of the piston whereas, as stated, in the operation of the known type of tension ring, these frictional forces are constant, depending upon the amount of tension introduced into the ring, and remain the same irrespective of the involved cycle of the engine.

Additionally, in the construction of this invention, the problem of ring flutter and consequent blow-by has been eliminated. This is because the ring seats tightly in a ring groove of complementary shape. There is no appreciable clearance between ring and groove. And also, in the operation of the V-shaped ring of the invention, gaseous pressure upon one side thereof tends to further seal the contact between the back side of the ring and the bottom of the groove. Hence, there is no possibility of ring chatter or flutter and, because of lack of clearance around the ring and particularly with respect to the bottom of the ring groove, blow-by is prevented.

Accordingly, it is a primary object of the instant invention to provide a V-shaped piston or sealing ring which is adapted to be seated in a ring groove of like contour and which is of a torsion type, i.e., does not rely entirely upon the inherent spring loading of the ring for sealing contact with the cylinder wall but is permitted to turn slightly in the ring groove in direct response to the impingement of gaseous pressure upon the exposed flanges of the ring.

It is a further object of the invention to provide a piston ring of the described type wherein the elasticity or resiliency of the side walls forming the V can be varied by either initial fabrication to predetermined thicknesses or, by grooving such side walls to such predetermined extents, the inherent elasticity of these walls can be varied to a desired degree.

It is another object of the invention to provide a piston ring of the described type that lends itself to ease of construction in relatively simple shaping operations of the material, such as steel or like metal. Being of the configuration noted above, the ring can easily be fabricated by rolling, pressing, or similar operations, in contrast to the casting operations which are necessarily involved in the fabrication of the ordinary cast iron, spring loaded tension rings of the prior art.

Another object of the invention is the provision of a ring of the described type which, because of its cross-sectional configuration, performs a dual purpose—the all-important sealing function and, in addition to this, the function of an oil ring. In other words, as will be seen from the following description, it will appear that the upper edge of the V-shaped configuration is adapted to fill the space between cylinder wall and piston against compressed gases, whereas the lower edge of the V at the same time effectively operates as an oil scraper ring preventing bypassing of the oil beyond the piston into the clearance or combustion space above the piston. In this regard, also, the configuration of the ring lends itself to varying the respective resilience found in each of the V edges; the upper edge, for example, can be made stiffer than the lower edge for it is the upper edge that requires a greater, positive, sealing contact with the cylinder wall.

Other objects, advantages and variations of the invention will be apparent to those skilled in the art after consideration of the following figures disclosing the invention, in which.

Figure 1:
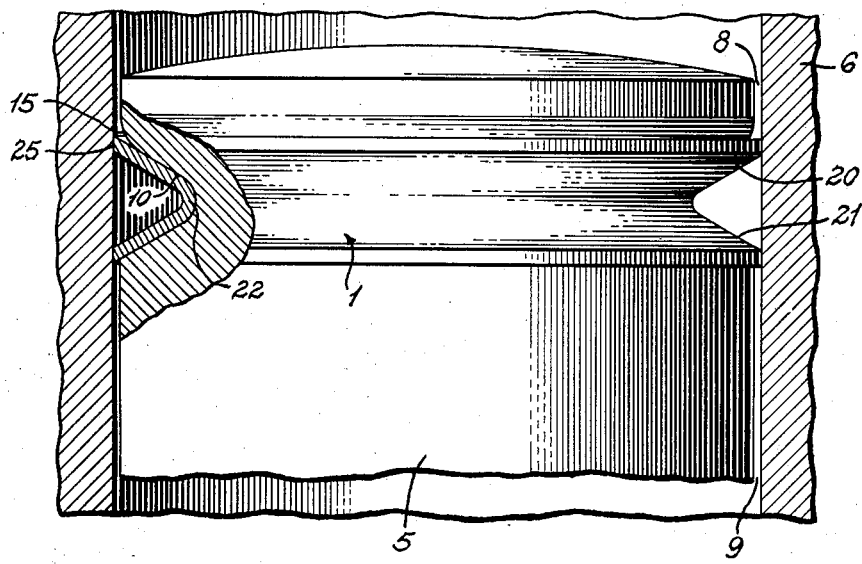
Figure 1 is an elevation view, partially in section, disclosing one embodiment of the invention mounted upon a piston having a ring groove of especial configuration and adapted to maintain the ring in the position indicated.

Referring to these figures, and particularly to Figure 1 wherein the ring is generally indicated at 1, it is seen that the same is mounted upon the piston 5 in a manner somewhat similar to the manner of positioning the ordinary type of piston ring. Such piston is, of course, located within the usual cylinder 6 with a relatively substantial clearance 8 existing between the piston and the cylinder, that space being sealed by the piston ring. In the instant case, it may be preferable to have the clearance 8 at the upper portion of the ring of greater amount than the clearance 9 around the lower, skirt portion of the piston for purposes which will be set forth hereinafter.

The one-piece, V-shaped rings comprising this invention are split rings to facilitate mounting upon the piston. They are mounted in ring grooves 10 of comparable dimension or of complementary shape, i.e., the rings fit with some exactness and with proper tolerance in such ring grooves 10 in order to assure a relatively effective seal between the inner periphery of the ring and such ring groove but the same are not positively interconnected with the piston ring groove so that they may slightly turn or twist within the groove.

Common to all embodiments of the invention is the formation of the upper portion of the piston just adjacent to the ring groove. Reference is here made to the sloping edge 15 of gradual curvature, with respect to the periphery of the piston, adjacent the ring groove. This described formation or rounded curvature permits combustion gases under high pressure to more readily penetrate to the upper surface or upper edge of the ring, thereby further facilitating the sealing effect of this upper flange of the ring. As stated above, if the clearance 8 is also of an amount appreciably in excess of that ordinarily utilized, such pressures are more effectively exerted against this upper flange of the V-ring.

In the embodiment of the invention of Figure 1, the ring, it will be noted, is of uniform thickness throughout, having reference to its cross-sectional configuration. In other words, the two sides of the ring, the upper side 20 and the lower side 21, are of the same third dimension; hence, in this embodiment of the invention the ring could be inverted with respect to its positioning on the piston and used just as effectively. These two edges or legs of the V of the ring, portions 20 and 21, are connected by an intermediate portion 22 having, with respect to its back portion, a continuous circular or approximately semi-circular configuration. This interconnecting portion or web 22 imparts elasticity to the ring thus promoting the sealing function as it is described herein.

Although not shown in plan and therefore not illustrated, it is to be understood that the V-shaped ring of the invention is a split ring to enable mounting thereof on the piston. It is fabricated with tolerances of sufficient nicety so that after placement upon the piston, the contacting edges 25 of the flange portions of the ring bear with some sealing effect, but relatively lightly, against the cylinder wall.

The thickness, in cross section, of the ring is a variable dependent upon the type of material out of which it is fabricated. However, those skilled in the art will be able to determine the thickness of same, by estimating the amount of resilience or elasticity desired to provide a ring with flanges that will flex consequent upon the application of pressure thereto. In other words, combustion gases forced against the upper edge of the topmost flange 10 tend to force that flange downwardly into tighter contact with the cylinder wall; obviously the thickness of such flange must be such as to permit this deflection. Such thickness being a variable dependent upon the type of material used, i.e., whether the ring is made of steel, cast iron, bronze, etc., those skilled in the art will be able to adjust this thickness to enable substantial responsiveness, by way of deflection, to such gaseous pressures.

As stated above, the lower flange 21 of this V-shaped ring performs the function of an oil ring and need not necessarily be as flexible, but is fitted within the cylinder with such tolerance as to effectuate this oil scraping function.

In other embodiments of the invention, the thickness of the described sides or flanges of the ring is varied or can be varied by either fabricating these flanges of different cross-sectional dimension or grooving them in such measure as to render the sealing flange of greater rigidity than the lower oil flange.

Figure 2:
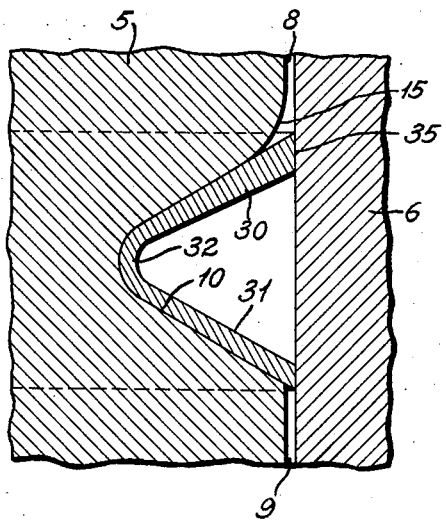
Figure 2 is an enlarged cross-sectional view of another embodiment of the invention.

For example, having specific reference to Figure 2, it is seen that the ring of the invention has been modified in this sense: the upper flange 30 or the side of the ring facing the combustion chamber is of greater thickness than the lower side 31 of the V formation. The result is to lend greater rigidity to the upper side 30 of the V-ring. This difference in cross sectional dimension is clearly apparent by reference to Figure 2. In cross section, the upper flange 30 of the V-shape might be described as conically tapered. Mathematically, the relative thickness of the two sides 30 and 31 is a variable dependent upon the type of metal used in the construction of the ring, and a variable also dependent upon the relative size of the ring. At any rate, this ring is interconnected by a rounded back portion 32 which, as in the previous case, adds resiliency or elasticity to the ring. Hence, the function thereof is largely the same as in the embodiment described with reference to Figure 1 with the possible exception that, in this instance, the upper flange 30, or the flange which seals off combustion gases, is less resilient than the lower flange 31, the latter having the same function as before—that of an oil seal. The lesser elasticity of the upper flange 30 is of course due to its relatively greater cross-sectional thickness. Also, in this instance, and due to the aforesaid conical taper, the sealing face 35 of the upper flange is of greater vertical proportion, affording a correspondingly greater and more effective sealing contact with the cylinder wall.

Figure 3:
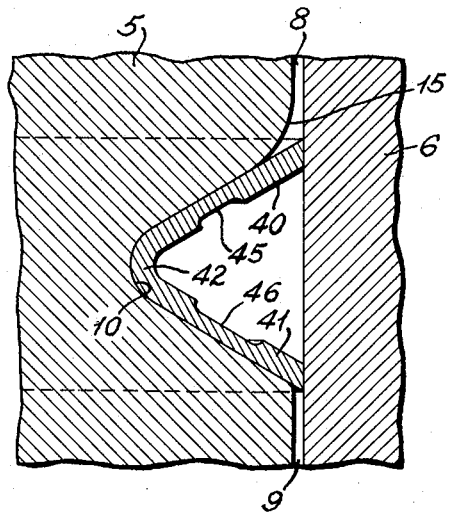
Figure 3 is an enlarged cross-sectional view of an additional embodiment of the invention.

In the embodiment of the invention of Figure 3, the same purposes and functions are obtained as with respect to the variations of the invention disclosed in Figures 1 and 2. Here, however, the respective resiliency or elasticity of the two flanges 40 and 41 are varied by grooving each of these flanges in sufficient amounts to attain the desired, respective flexibility. Such grooves may have different widths and/or depths to thus vary the amount of flexibility of each flange. Thus, a groove 45 cut into the upper flange 40 is of less width than the groove 46 cut into the lower flange 41. The result is apparent—the upper flange 40 will be far less elastic, or relatively more rigid, than the lower flange. Here again, the size of such grooves with respect to both width and depth must remain a variable, recognizable by those skilled in the art. This is necessarily a variant which cannot be mathematically computed herein for the size of the ring, the material out of which it is fabricated, and the expected, involved pressures under operative conditions, all play a large part in the determination of the size of the respective grooves 45 and 46.

As in the other embodiments of the invention, the two edges 40 and 41 are joined by the back circular configuration 42 which contributes to the springiness and, hence, responsiveness of the upper flange 40 to gaseous pressure.

In each case then, it is to be appreciated that the ring serves a dual purpose—that of a sealing ring and that of an oil ring. Fabricated with predetermined tolerances to fit within a cylinder such as to lightly bear against the cylinder wall, the upper flange of the ring, being directly responsive to combustion pressures, seals tightly against the cylinder wall during working strokes of the piston, but contacts the wall with much less force during non-working strokes of the piston.

It is also apparent that this type of ring can be fabricated, using the tension principle. For example, the ring may be of a material to permit its spring loading such as the ordinary type of tension ring. But the spring loading can be predetermined to be of an amount that would merely permit a rather light contact of the sealing flanges against the wall of the cylinder. This light contact, as explained above, is substantially increased to attain a tighter and more effective sealing contact during working phases of the engine.

Also, because during a substantial portion of operation of the engine the ring is in relatively light contact with the cylinder wall, the involved frictional forces are substantially reduced below those normally encountered in the use of the common type of tension ring. The result is a piston ring of greater durability and longer life. In addition, the sealing function is one that is performed, for the reasons herein given, in a far more efficient manner than is customary with known types of ordinary tension rings.

We claim:

1. A torsion ring adapted for use upon a piston mounted in a cylinder of an internal combustion engine, said ring comprising an annular element, said element being V-shaped in cross-sectional configuration and comprising a peripheral web and two legs, said web being substantially semi-circular in configuration, said legs being angularly disposed to each other and forming two opposed flanges each of which terminates in a cylinder wall contacting face, a ring groove in said piston of a shape complementary to the shape of the inner periphery of said web, said web being mounted for independent movement with respect to said groove whereby said ring may rotate to press said faces against the cylinder wall, said element being of a resilient material to permit flexing thereof upon the application of pressure thereto, said flexing and said rotation causing both of said legs to come into tighter sealing contact with the wall of said cylinder.

2. A sealing ring adapted for use upon the piston of an internal combustion engine, said ring comprising an annular element, said element being V-shaped in cross section, and having two opposed upper and lower flanges terminating in cylinder wall contacting faces and angularly disposed to each other, the upper of said flanges being of greater rigidity than the lower thereof, a ring groove in said piston, said groove being of a shape complementary to the shape of the inner periphery of said ring, whereby combustion gases under pressure force the sealing face of said upper flange into tighter sealing contact with said cylinder wall, and said lower flange functions as an oil seal.

3. A sealing ring adapted for use upon the piston of an internal combustion engine, said ring comprising an annular element, said element being V-shaped in cross section, and having two opposed upper and lower flanges terminating in cylinder wall contacting faces and angularly disposed to each other, the upper of said flanges being of greater cross-sectional thickness than the lower of said flanges, whereby the upper flange is less flexible than said lower flange, a ring groove in said piston, said groove being of a shape complementary to the shape of the inner periphery of said ring, whereby combustion gases under pressure force the sealing face of said upper flange into tighter sealing contact with said cylinder wall.

4. A sealing ring adapted for use upon the piston of an internal combustion engine, said ring comprising an annular element, said element being V-shaped in cross section, and having two opposed upper and lower flanges terminating in cylinder wall contacting faces and angularly disposed to each other, said flanges having grooves on the inner, annular sides thereof, the groove in said upper flange being of lesser proportion than the groove in said lower flange, whereby said lower flange is of greater flexibility and resiliency, a ring groove in said piston, said groove being of shape complementary to the shape of the inner periphery of said ring, whereby combustion gases under pressure force the sealing face of said upper flange into tighter sealing contact with said cylinder wall.

5. A sealing ring adapted for use upon the piston of an internal combustion engine, said ring comprising an annular element, said element being V-shaped in cross section, and having two opposed flanges terminating in cylinder wall contacting faces and angularly disposed to each other, a ring groove in said piston, said groove being of a shape complementary to the shape of the inner periphery of said ring, said piston having an annular, rounded cut-away portion adjacent said ring groove to facilitate the passage of gases under pressure to the upper edge of said upper flange, whereby combustion gases under pressure force the sealing face of said upper flange into tighter sealing contact with said cylinder wall.

6. A sealing ring adapted for use upon the piston of an internal combustion engine, said ring being of the split type and comprising an annular element, said element being V-shaped in cross section, and having two opposed flanges terminating in cylinder wall contacting faces and angularly disposed to each other, the upper of said flanges being of greater cross-sectional area than the lower flange, the contacting face of said upper flange being of greater area than the contacting face of said lower flange, said difference in area rendering said upper flange of greater rigidity than said lower flange, a ring groove in said piston, said groove being of a shape complementary to the shape of the inner periphery of said ring, whereby combustion gases under pressure force the sealing face of said upper flange into tighter sealing contact with said cylinder wall.

References Cited in the file of this patent

UNITED STATES PATENTS

| | | |
|---|---|---|
| 2,088,357 | Wuestefeldt | July 27, 1937 |
| 2,226,273 | Wuestefeldt | Dec. 24, 1940 |
| 2,579,115 | Harrah | Dec. 18, 1951 |